US012282779B2

(12) United States Patent
Liu et al.

(10) Patent No.: US 12,282,779 B2
(45) Date of Patent: Apr. 22, 2025

(54) INSTRUCTION RETIREMENT UNIT, INSTRUCTION EXECUTION UNIT, PROCESSING UNIT, COMPUTING DEVICE, AND INSTRUCTION PROCESSING METHOD FOR PERFORMING RETIREMENT PROCESSING ON INSTRUCTIONS BASED ON INSTRUCTION COMPLETION INFORMATION

(71) Applicant: C-SKY MICROSYSTEMS CO., LTD., Hangzhou (CN)

(72) Inventors: Chang Liu, Pudong New Area (CN); Haowen Chen, Hangzhou (CN); Tao Jiang, Hangzhou (CN)

(73) Assignee: C-SKY MICROSYSTEMS CO., LTD., Hangzhou (CN)

( * ) Notice: Subject to any disclaimer, the term of this patent is extended or adjusted under 35 U.S.C. 154(b) by 278 days.

(21) Appl. No.: 18/148,759

(22) Filed: Dec. 30, 2022

(65) Prior Publication Data

US 2023/0401062 A1 Dec. 14, 2023

(30) Foreign Application Priority Data

Jun. 14, 2022 (CN) .......................... 202210667352.7

(51) Int. Cl.
*G06F 9/38* (2018.01)
(52) U.S. Cl.
CPC .......... *G06F 9/3854* (2023.08); *G06F 9/3856* (2023.08); *G06F 9/3858* (2023.08); *G06F 9/3861* (2013.01)

(58) Field of Classification Search
CPC .... G06F 9/3861; G06F 9/3854; G06F 9/3856; G06F 9/3858
See application file for complete search history.

(56) References Cited

U.S. PATENT DOCUMENTS 6,070,235 A    5/2000  Cheong et al.
6,425,072 B1 * 7/2002  Meier ................... G06F 9/3858
                                                    712/218

(Continued)

OTHER PUBLICATIONS

Extended European Search Report issued by the European Patent Office for corresponding EP Application No. 22217393.2, Nov. 2, 2023, 11 pages.

*Primary Examiner* — Courtney P Spann
(74) *Attorney, Agent, or Firm* — Foley & Lardner LLP

(57) ABSTRACT

The embodiments of the present application provide an instruction retirement unit, an instruction execution unit, and a related apparatus and method. The instruction retirement unit includes: a reception subunit, configured to receive a completion request signal; an arbitration subunit, configured to send a completion permission signal to an instruction execution unit after determining that instructions to be completed can be completed, and store instruction completion information of the instructions to be completed into instruction buffer table entries in a buffer; and a retirement subunit, configured to perform, based on the instruction completion information stored in each of the instruction buffer table entries, retirement processing on instructions that have already been completed and have not been retired, and delete the instruction completion information of retired instructions from the instruction buffer table entries.

18 Claims, 7 Drawing Sheets

(56) References Cited

U.S. PATENT DOCUMENTS

| | | | |
|---|---|---|---|
| 7,096,345 B1* | 8/2006 | Chen | G06F 9/3858 |
| | | | 712/217 |
| 2012/0079488 A1 | 3/2012 | Phillips et al. | |
| 2017/0132010 A1* | 5/2017 | Vasekin | G06F 9/384 |
| 2021/0294642 A1* | 9/2021 | Greenhalgh | G06F 9/3856 |
| 2021/0382715 A1 | 12/2021 | Takata et al. | |

* cited by examiner

INSTRUCTION RETIREMENT UNIT, INSTRUCTION EXECUTION UNIT, PROCESSING UNIT, COMPUTING DEVICE, AND INSTRUCTION PROCESSING METHOD FOR PERFORMING RETIREMENT PROCESSING ON INSTRUCTIONS BASED ON INSTRUCTION COMPLETION INFORMATION

The present application claims priority to Chinese patent application No. 202210667352.7, filed with the Chinese Patent Office on Jan. 10, 2020 and entitled "INSTRUCTION RETIREMENT UNIT, INSTRUCTION EXECUTION UNIT, AND RELATED APPARATUS AND METHOD", which is incorporated herein by reference in its entirety.

TECHNICAL FIELD

Embodiments of the present application relate to a field of chip technology, and in particular to an instruction retirement unit, an instruction execution unit, and a related apparatus and method.

BACKGROUND

In a processing unit of out-of-order execution architecture, applying a dynamic scheduling technique to reorder the execution of instructions may reduce stalls while maintaining data flow, thus improving the performance of the processing unit. With the dynamic scheduling technique, relevant problems which cannot be predicted during compiling can be resolved without specific optimization of the processing unit architecture through software, and the processing unit may remain bubble-free when a large delay occurs. After reordering the execution of instructions through the dynamic scheduling technique, it is necessary to restore the execution order of the instructions after the instructions are executed, so that the instructions are submitted orderly and the correctness of overall execution behavior is ensured.

For the processing unit of out-of-order execution architecture, a re-order buffer (ROB) is currently used to temporarily store an execution result of instructions and enable the instructions to be submitted in the original order.

However, when the execution result of instructions is temporarily stored by using the ROB and the execution order is restored, for a certain instruction, occupancy of the instruction in an instruction buffer table entry in the ROB starts from the dispatch of the instruction until the instruction is retired. Therefore, each instruction being executed in the processing unit is assigned an instruction buffer table entry, and the number of instruction buffer table entries is equal to an out-of-order degree allowed by the processing unit. The processing unit needs to consume more resources to maintain the ROB, which in turn causes hardware resources for an instruction reordering part to be consumed largely when the processing unit performs out-of-order processing.

SUMMARY

For this reason, embodiments of the present application provide an instruction retirement unit, an instruction execution unit, and a related apparatus and method, in order to at least address or alleviate the above problems.

According to the first aspect of the embodiments of the present application, an instruction retirement unit is provided, which includes: a reception subunit, configured to receive a completion request signal, which is sent by an instruction execution unit for instructions to be completed, wherein the completion request signal is used to request completion of the instructions to be completed; an arbitration subunit, configured to, after determining, based on a new-old relationship between retired instructions and the instructions to be completed, that the instructions to be completed can be completed, send, to the instruction execution unit, a completion permission signal for the instructions to be completed, receive instruction completion information of the instructions to be completed sent from the instruction execution unit, and store the instruction completion information of the instructions to be completed into instruction buffer table entries in a buffer, wherein a number of the instruction buffer table entries in the buffer is greater than 1 and less than an out-of-order degree allowed by a processing unit, and each of the instruction buffer table entries is used to store the instruction completion information of one instruction; and a retirement subunit, configured to perform, based on the instruction completion information stored in each of the instruction buffer table entries, retirement processing on instructions that have already been completed and have not been retired, and delete the instruction completion information of the retired instructions from the instruction buffer table entries.

According to the second aspect of the embodiments of the present application, an instruction execution unit is provided, which includes: a request subunit, configured to send a completion request signal to an instruction retirement unit, wherein the completion request signal is used to request completion of instructions to be completed; and a sending subunit, configured to, after receiving a completion permission signal sent from the instruction retirement unit, send instruction completion information of the instructions to be completed to the instruction retirement unit, wherein the instruction retirement unit stores the instruction completion information into instruction buffer table entries in a buffer, performs, based on the instruction completion information stored in each of the instruction buffer table entries, retirement processing on the instructions to be retired that have already been completed and have not been retired, and deletes the instruction completion information of retired instructions from the instruction buffer table entries, wherein a number of the instruction buffer table entries in the buffer is greater than 1 and less than an out-of-order degree allowed by a processing unit, and each of the instruction buffer table entries is used to store the instruction completion information of one instruction.

According to the third aspect of the embodiments of the present application, a processing unit is provided, which includes: the instruction retirement unit according to the first aspect; and at least one instruction execution unit according to the second aspect.

According to the fourth aspect of the embodiments of the present application, a computing device is provided, which includes: the processing unit according to the third aspect; and a memory which is coupled to the processing unit and stores instructions to be executed.

According to the fifth aspect of the embodiments of the present application, an instruction processing method applied to an instruction retirement unit is provided, which includes: receiving a completion request signal, which is sent by an instruction execution unit for instructions to be completed, wherein the completion request signal is used to request completion of the instructions to be completed; after determining, based on a new-old relationship between retired instructions and the instructions to be completed, that the instructions to be completed can be completed, sending, to the instruction execution unit, a completion permission signal for the instructions to be completed, receiving instruction completion information of the instructions to be completed sent from the instruction execution unit, and storing the instruction completion information of the instructions to be completed into instruction buffer table entries in a buffer, wherein a number of the instruction buffer table entries in the buffer is greater than 1 and less than an out-of-order degree allowed by a processing unit, and each of the instruction buffer table entries is used to store the instruction completion information of one instruction; and performing, based on the instruction completion information stored in each of the instruction buffer table entries, retirement processing on instructions that have already been completed and have not been retired, and deleting the instruction completion information of the retired instructions from the instruction buffer table entries.

According to the sixth aspect of the embodiments of the present application, an instruction processing method applied to an instruction execution unit is provided, which includes: sending a completion request signal to an instruction retirement unit, wherein the completion request signal is used to request completion of instructions to be completed; and after receiving a completion permission signal sent from the instruction retirement unit, sending instruction completion information of the instructions to be completed to the instruction retirement unit, wherein the instruction retirement unit stores the instruction completion information into instruction buffer table entries in a buffer, performs, based on the instruction completion information stored in each of the instruction buffer table entries, retirement processing on the instructions to be retired that have already been completed and have not been retired, and deletes the instruction completion information of retired instructions from the instruction buffer table entries, wherein a number of the instruction buffer table entries in the buffer is greater than 1 and less than an out-of-order degree allowed by a processing unit, and each of the instruction buffer table entries is used to store the instruction completion information of one instruction.

According to the solution of restoring an instruction execution order provided by the embodiments of the present application, the number of the instruction buffer table entries in the buffer is less than the out-of-order degree of the processing unit, instructions are completed in order, the instruction completion information of completed instructions is stored into the instruction buffer table entries, retirement processing is performed on the instructions to be retired based on the instruction completion information in the instruction buffer table entries, and the instruction completion information of retired instructions is deleted from the instruction buffer table entries. Since the instruction buffer table entries store the instruction completion information of instructions that have been completed and retired or are retired, the instructions take up the instruction buffer table entries at completion and retirement phases. Therefore, the buffer only needs to contain a small number of instruction buffer table entries to satisfy the out-of-order execution of the processing unit, and maintaining fewer instruction buffer table entries can reduce the consumption of hardware resources for the instruction reordering part when the processing unit performs out-of-order processing.

BRIEF DESCRIPTION OF THE DRAWINGS

In order to describe the embodiments of the present application or the technical solution of the prior art more clearly, briefly introduction of the drawings needed to be used in the embodiments or the prior technical will be description below. Obviously, the drawings in the following description are only some embodiments recorded in the embodiments of the present application. Other drawings can also be obtained based on these drawings for those of ordinary skill in the art.

DETAILED DESCRIPTION

Figure 1:
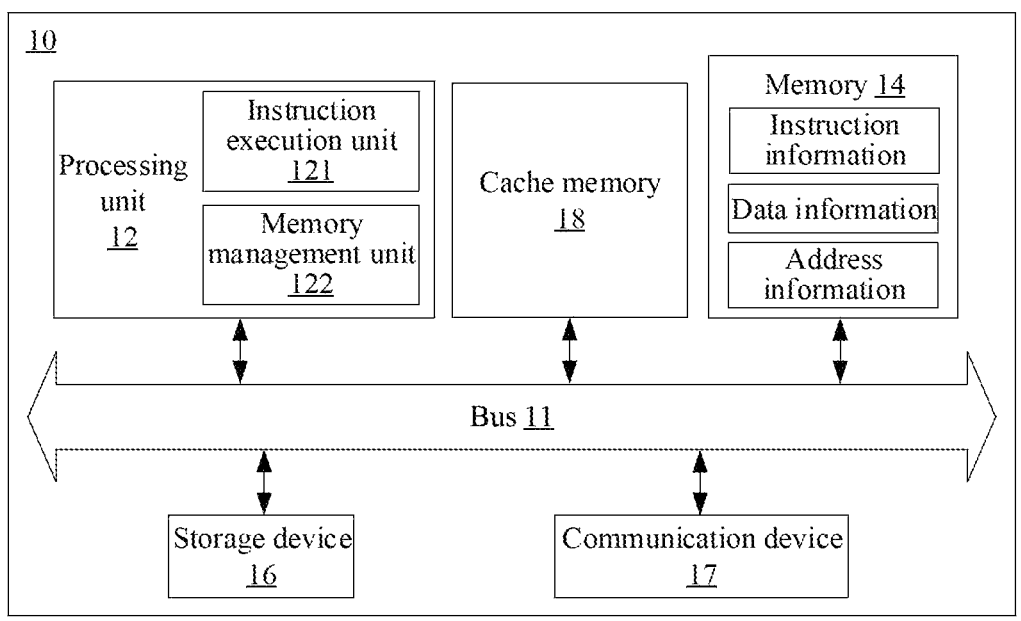
FIG. 1 is a schematic diagram of a computing device according to an embodiment of the present application.

The present application is depicted below based on embodiments, but the present application is not limited to these embodiments. In the following detailed description of the present application, some specific details are described in detail. It is possible for a person having ordinary skill in the art to fully understand the present application without the descriptions of these details. In order to avoid confusing the essence of the present application, those well-known methods, processes and procedures are not described in detail. In addition, the drawings are not necessarily drawn to scale.

First, some nouns or terms appearing in the process of describing the embodiments of the present application are applicable to the following explanations.

Speculation execution: the speculation execution is an optimization technique. A processor using the speculation execution technique may predict, based on existing information, a program flow and branch directions, and use idle time to advance the execution of later instructions in the program flow, based on the prediction result. The instructions executed in advance may or may not be used subsequently.

Correct path: The path that the program flow executes to in a case where a speculation failure occurs. Speculation instructions located on a correct path need to produce execution effects, and the speculation instructions located on the correct path are older than speculation failure instructions that cause a speculation failure.

Error path: The path that the program flow does not execute to in a case where a speculation failure occurs. Speculation instructions located on an error path do not need to produce execution effects, and the speculation instructions located on the error path are newer than speculation failure instructions that cause a speculation failure.

Speculation failure instructions: The instructions that cause a speculation failure. Speculation instructions newer than the speculation failure instructions do not need to achieve execution effects, while speculation instructions older than the speculation failure instructions need to achieve execution effects.

Pipeline flushing: Processor's behaviors that remove the speculation instructions located on an error path inside in a case where a speculation failure occurs.

Dynamic scheduling: Rearranging the order in which instructions are executed to reduce stalls in processing units while maintaining data flow.

Out-of-order execution: A processing unit schedules dynamically instruction flows, to expect an instruction to be executed once its operands and the instruction execution unit become available, without waiting for its preceding instruction to finish execution.

Dispatching: The process of bringing an instruction from an ordered state to an out-of-order state in the processing unit of the out-of-order execution architecture, which is usually implemented by an instruction transmitting unit in the processing unit. In a general implementation process, decoding, dispatch and sending of instructions can be implemented by an instruction decoding unit.

Transmission: A process of transmitting instructions to an instruction execution unit to start instruction execution, which is usually implemented by the instruction transmitting unit.

Submission: Instructing instructions to be allowed to change the status of a processor, to produce an execution effect visible to a programming model, which is usually implemented by the instruction execution unit.

Writeback: The instruction execution unit executes to change the status of the processor visible to the programming model, including register values, which is usually implemented by the instruction retirement unit in the processing unit.

Completion: The instruction execution unit returns execution results (instruction completion information) of executions other than the execution of purpose register values, the completion of instructions means that the instruction execution unit determines that the instructions can be executed and completed, and the completion of the instructions is implemented by the instruction retirement unit in the processing unit.

Retirement: The processing unit completes the execution of instructions, which is usually implemented by the instruction retirement unit in the processing unit.

Computing Device

FIG. 1 shows a schematic block diagram of a computing device 10. The computing device 10 can be constructed based on various types of processing units and driven by any operating system, such as WINDOWS operating system, UNIX operating system and Linux operating system. In addition, the computing device 10 may be implemented in hardware and/or software, such as PC, desktop, laptop, server, and mobile communication device.

As shown in FIG. 1, the computing device 10 may include a memory 14 and one or more processing units 12. The memory 14 in the computing device 10 can be used as a main memory (hereinafter referred to as main memory or internal memory) to store instruction information and/or data information represented by data signals. For example, the memory 14 may store data (such as budget results) provided by the processing unit 12, and may also be used to realize data exchange between the processing unit 12 and an external storage device 16 (or referred to as an auxiliary memory or external memory).

In some cases, the processing unit 12 needs to access the memory 14 through the bus 11 to obtain or modify the data in the memory 14. Since an access speed of the memory 14 is slow, in order to alleviate a speed gap between the processing unit 12 and the memory 14, the computing device 10 also includes a cache memory 18 connected to the bus 11 in communication. The cache memory 18 is used to cache in the memory 14 some program data or packet data that may be called repeatedly. The cache memory 18 may be implemented by a storage device such as a Static Random Access Memory (SRAM). The cache memory 18 may be a multi-level structure, such as a three-level cache structure with L1 Cache, L2 Cache and L3 Cache. The cache memory 18 can also be a cache structure with more than three levels or other types of cache structure. In some embodiments, a portion of the cache memory 18 (such as the first level cache, or both the first level cache and the second level cache) may be integrated within the processing unit 12 or integrated in the same on-chip system with the processing unit 12.

Based on this, the processing unit 12 may include instruction execution unit 121, memory management unit 122, and other parts. The instruction execution unit 121 initiates a write access request when executing some instructions that need to modify the memory. The write access request specifies write data, which needs to be written to the memory, and corresponding physical address. The memory management unit 122 is used to translate a virtual address specified by these instructions into a physical address mapped by the virtual address. The physical address specified by the write access request can be consistent with the physical address specified by the corresponding instruction.

The information interaction between the memory 14 and the cache memory 18 may be organized according to data block. In some embodiments, the cache memory 18 and the memory 14 can be divided into data block according to the same space, and the data block can be used as the minimum unit of data exchange between the cache memory 18 and the memory 14 (including one or more pieces of data with preset length). In order to give a brief and clear description, each data block in the cache memory 18 is hereinafter referred to as a cache block (or can be referred to as a cacheline or cache line), and different cache blocks have different cache block addresses. Each data block in the memory 14 is referred to as a memory block, and different memory blocks have different memory block addresses. The cache block address and/or memory block address may include a physical address label for locating the data block.

Due to the limitation of space and resource, the cache memory 18 cannot cache all the contents in the memory 14. That is, the storage capacity of the cache memory 18 is usually smaller than the memory 14. Each cache block address provided by the cache memory 18 cannot correspond to all the memory block addresses provided by the memory 14. When the processing unit 12 needs to access the memory, the processing unit 12 accesses the cache memory 18 through the bus 11 firstly to determine whether the content to be accessed has been stored in the cache memory 18. Cache Memory 18 has been hit if the content to be accessed has been stored in the cache memory 18, and processing unit 12 directly calls the content to be accessed from the cache memory 18. If the content to be accessed has not been stored in the cache memory 18, the cache memory 18 and the processing unit 12 need to access the memory 14 via the bus 11 to find the corresponding information in the memory 14. Because the access rate of the cache memory 18 is very fast, the efficiency of the processing unit 12 may be improved significantly when the cache memory 18 has been hit, and therefore the performance and efficiency of the entire computing device 10 have been improving.

In addition, the computing device 10 may also include input/output devices, such as storage device 16, display device, audio device, mouse/keyboard and the like. The storage device 16 may be a device, such as a hard disk, optical disk, flash memory and the like, used for storing and accessing information which is coupled to bus 11 through a corresponding interface. The display device may be coupled to the bus 11 through the corresponding display card to display according to the display signal provided by the bus 11.

The computing device 10 may also include a communication device 17, and therefore the computing device 10 may communicate with a network or other devices in various ways. The communication device 17 may include one or more communication modules, and the communication device 17 may include a wireless communication module suitable for a particular wireless communication protocol. For example, the communication device 17 may include a WLAN module to realize the WiFi communication in accordance with the 802.11 standard established by the Institute of Electrical and Electronic Engineers (IEEE). The communication device 17 can include a WWAN module for wireless wide area communication in accordance with cellular or other wireless wide area protocols. The communication device 17 may also include a communication module using other protocols, such as a Bluetooth module, or other customized communication modules. The communication device 17 may also be a port for serial transmission of data.

It should be noted that the structure of different computing devices 10 may vary depending on mainboard, operating system and instruction set architecture. For example, at present, many computing devices are provided with an input/output control center connected between the bus 11 and various input/output devices, and the input/output control center may be integrated within the processing unit 12 or independent with the processing unit 12.

Processing Unit

Figure 2:
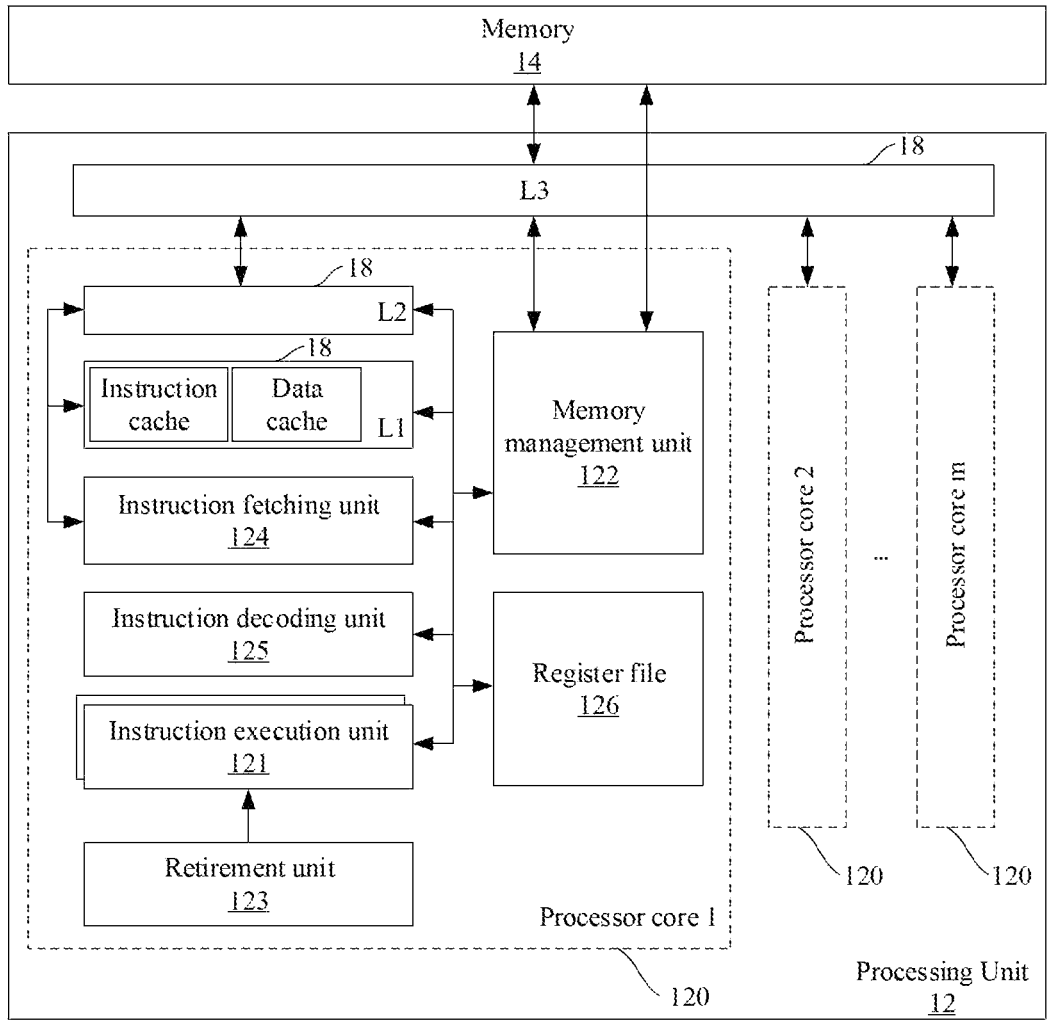
FIG. 2 is a schematic diagram of a processing unit according to an embodiment of the present application.

FIG. 2 is a schematic block diagram of the processing unit 12 according to one embodiment of the present application. As shown in FIG. 2, each processing unit 12 may include one or more processor cores 120 for processing instructions, and the processing and execution of instructions may be controlled by a user (for example, through an application program) and/or the system platform. Each processor core 120 may be used to process a specific instruction set. The instruction set can support Complex Instruction Set Computing (CISC), Reduced Instruction Set Computing (RISC) or computing based on Very Long Instruction Word (VLIW). In particular, processor core 120 is applicable to processing RISC-V instruction set. Different processor cores 120 may each process different instruction sets or the same instruction set. The processor core 120 may also include other processing modules, such as Digital Signal Processor (DSP), etc. As an example, FIG. 2 shows processor core 1 to processor core m, and m is a positive integer.

FIG. 1 shows the cache memory 18 may be fully or partially integrated in the processing unit 12. According to different architectures, the cache memory 18 may be a single or multi-level internal cache memory located within and/or outside each processor core 120 (the three-level cache memories L1 to L3 as shown in FIG. 2, uniformly identified as 18 in FIG. 2), and may also include instruction cache oriented to instruction and data cache oriented to data. Each component in the processing unit 12 may share at least part of the cache memory. For example, processor cores 1 to processor cores m may share the third level cache memory L3. The processing unit 12 may also include external cache (not shown), and other cache structures may also be used as an external cache of the processing unit 12.

As shown in FIG. 2, the processing unit 12 may include a Register File 126. The Register File 126 may include multiple registers for storing different types of data and/or instructions. These registers may be of different types. For example, the register stack 126 may include integer register, floating point register, status register, instruction register and pointer register, etc. The registers in the register stack 126 may be implemented by using general registers, or by specialized designs which is adopted according to actual requirements of the processing unit 12.

The processing unit 12 may include a Memory Management unit (MMU) 122 for translating virtual address to physical address. The memory management unit 122 caches part of table entries in page table, and the memory management unit 122 may also obtain, from the memory, the table entries that are not cached. One or more memory management units 122 can be set in each processor core 120, and memory management units 122 in different processor cores 120 may synchronize with memory management units 122 located in other processing units or processor cores, so that each processing unit or processor core may share a unified virtual storage system.

The processing unit 12 is used to execute a sequence of instructions (such as a program). The process of executing each instruction by the processing unit 12 includes: fetching an instruction from the memory where the instruction is stored, decoding the fetched instruction, executing the decoded instruction, and holding the instruction execution result, and so on until all instructions in the instruction sequence are executed or a shutdown instruction is encountered.

In order to implement the above process, the processing unit 12 may include instruction fetching unit 124, instruction decoding unit 125, instruction transmitting unit (not shown), instruction executing unit 121, retirement unit 123, and the like.

The instruction fetching unit 124, as a starting engine of the processing unit 12, is used to move instruction from the memory 14 to the instruction register (which may be one register for storing instructions in register stacks 126 shown in FIG. 2), and receive a next instruction fetching address or calculate a next instruction fetching address according to an instruction fetching algorithm. The instruction fetching algorithm may increase address or decrease address according to instruction length.

After the instruction is fetched, the processing unit 12 enters an instruction decoding stage, and the instruction decoding unit 125 decodes the fetched instruction according to the predetermined instruction format to obtain operand acquisition information required by the fetched instruction, so as to prepare for the operation of the instruction execution unit 121. The operand acquisition information may include software/hardware that points to immediate data, a register, or other sources which can provide operand.

The instruction transmitting unit usually exists in the high-performance processing unit 12, which is located between the instruction decoding unit 125 and the instruction execution unit 121. The instruction transmitting unit is used for scheduling and controlling instructions to efficiently allocate each instruction to different instruction execution units 121, to enable parallel operation of multiple instructions. After the instruction is fetched, decoded and scheduled to the corresponding instruction execution unit 121, the corresponding instruction execution unit 121 starts to execute the instruction, that is, to execute the operation indicated by the instruction, to realize the corresponding function.

The retirement unit 123 (or referred to as instruction retirement unit or instruction writeback unit) is mainly used to write an instruction execution result, which is generated by the instruction execution unit 121, back to a corresponding storage location (for example, a register in the processing unit 12), so that a subsequent instruction can quickly obtain the corresponding execution result from the storage location.

Different instruction execution units 121 may be set in the processing unit 12 for different types of instructions. The instruction execution unit 121 may be an operation unit (including, for example, arithmetic logic unit, shaping processing unit, vector operation unit, vector configuration unit, and the like, for performing operations according to operand and outputting operation result), a memory execution unit (for example, for accessing memory according to instructions to read data from memory or write specified data to memory, and the like), a coprocessor, and the like. In the processing unit 12, each instruction execution unit 121 may operate in parallel and output corresponding execution result.

When executing certain kinds of instructions (such as memory access instruction), the instruction execution unit 121 needs to access the memory 14 to obtain information stored in the memory 14 or provide data to be written into the memory 14. It should be noted that the instruction execution unit 121 for executing memory access instructions may also be referred to as a memory execution unit. The memory execution unit may be a Load Store Unit (LSU) and/or other units for memory access.

After the memory access instruction is acquired by the instruction fetching unit 124, the instruction decoding unit 125 may decode the memory access instruction so that the source operand of the memory access instruction may be acquired. The memory access instruction after decoding processing is provided to the corresponding instruction execution unit 121, and the corresponding instruction execution unit 121 may perform corresponding operations on the source operand of the memory access instruction (for example, the source operand stored in the register is operated by arithmetic logic unit) to obtain the address information corresponding to the memory access instruction, and send corresponding requests according to the address information, such as address translation request, write access request, etc.

The source operand of the memory access instruction usually includes address operand, and the address operand is calculated by the instruction execution unit 121 to obtain the virtual address or physical address corresponding to the memory access instruction. When the memory management unit 122 is disabled, the instruction execution unit 121 may directly obtain the physical address of the memory access instruction through logical operation. When the memory management unit 121 is enabled, the corresponding instruction execution unit 121 initiates, according to the virtual address corresponding to the memory access instruction, an address translation request. The address translation request includes the virtual address corresponding to the address operand of the memory access instruction. The memory management unit 122 responds to the address translation request and converts the virtual address in the address translation request into a physical address according to table entry which has been matched to the virtual address, so that the instruction execution unit 121 may access the cache memory 18 and/or memory 14 according to the translated physical address.

According to the different functions, the memory access instruction may include load instruction and storage instruction. The execution process of the load instruction usually does not need to modify the information in the memory 14 or the cache memory 18, and the instruction execution unit 121 only needs to read, according to the address operand of the load instruction, the data stored in the memory 14, the cache memory 18 or the external storage device. Different from the load instruction, the source operand of the storage instruction includes not only the address operand, but also the data information. The execution process of the storage instruction usually requires to modify the information in the memory 14 and/or the cache memory 18. The data information of the storage instruction may point to the written data. The source of the written data may be the execution result of an operation instruction, a load instruction, etc., or the data provided by the register in the processing unit 12 or other storage units, or it can be an immediate data.

The processing unit 12 may implement a micro out-of-order architecture, in which while instructions are sent in an out-of-order way, the instructions need to take up the table entries in the ROB only during the completion and retirement phases of the instructions as opposed to taking up the table entries in the ROB during the entire execution life cycle, thus there is no need to maintain the entire ROB, and in turn the required resources for the maintenance of the ROB s may be reduced and the resources consumed by the processing unit 12 may be reduced. In addition, because the instructions take up the table entries in the ROB only during the completion and retirement phases, the number of the table entries in the ROB may be reduced. Therefore, a smaller ROB can meet the demand, and reducing the ROB may reduce the cost for processing unit 12.

For the processing unit 12 of out-of-order execution architecture, the processing unit 12 may also include an instruction dispatching unit. The instruction dispatching unit may convert instructions from an ordered state to a disordered state, and assign instruction identifiers (instruction IDs) to the instructions, so that the instruction execution unit 121 and the instruction retirement unit 123 can determine the new-old relationship of the instructions based on the instruction identifiers. After the instruction dispatching unit converts the instructions to be out-of-order instructions, the instruction transmitting unit may transmit the out-of-order instructions to the instruction execution unit 121, so that the instruction execution unit 121 executes the instructions out of order.

The embodiments of the present application focus on the instruction completion and retirement processes of the instruction retirement unit 123 and the instruction submission process of the instruction execution unit 121. The completion, retirement and submission of instructions will be described in detail in the following.

Instruction Retirement Unit

Dynamic scheduling may rearrange the execution order of functions, to reduce the stalls during the execution of instruction sequences, thus improving the performance of the processing unit. However, after the out-of-order execution of the instructions, the execution order of the functions needs to be restored to submit the executed instructions in order, thus ensuring that the overall execution behavior is correct.

Figure 3:
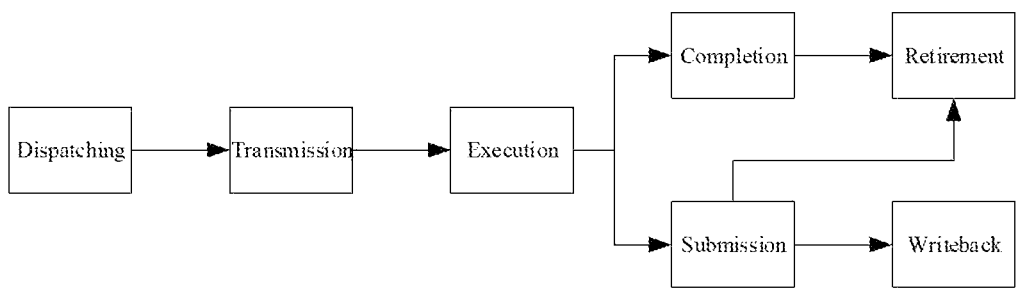
FIG. 3 is a schematic diagram of an instruction execution stage according to an embodiment of the present application.

Currently, the instruction retirement unit 123 maintains the ROB, temporarily stores the instruction execution result using the ROB and restores the execution order. As shown in FIG. 3, for the processing unit 12 of out-of-order architecture, the execution life cycle of each instruction needs to go through multiple stages, including dispatching, transmission, execution, completion, submission, writeback, retirement, etc. The instructions will take up the instruction buffer table entries in the ROB from the dispatching until retirement, that is, the instructions require to take up the instruction buffer table entries in the ROB during the entire execution life cycle. Therefore, the number of the instruction buffer table entries is equal to the out-of-order degree allowed by the processing unit 12. Due to the large number of the instruction buffer table entries included in the ROB, the instruction retirement unit 123 needs to consume large number of resources to maintain the ROB, thus resulting in relatively large consumption of resources for the processing unit 12.

The embodiments of the present application are provided to deal with the problem that maintaining the ROB consumes relatively large resources. It is mainly implemented by the instruction execution unit 121 and the instruction retirement unit 123. The internal structure of the instruction retirement unit 123 and the implementation of the embodiments of the present application are discussed in detail in the following.

Figure 4:
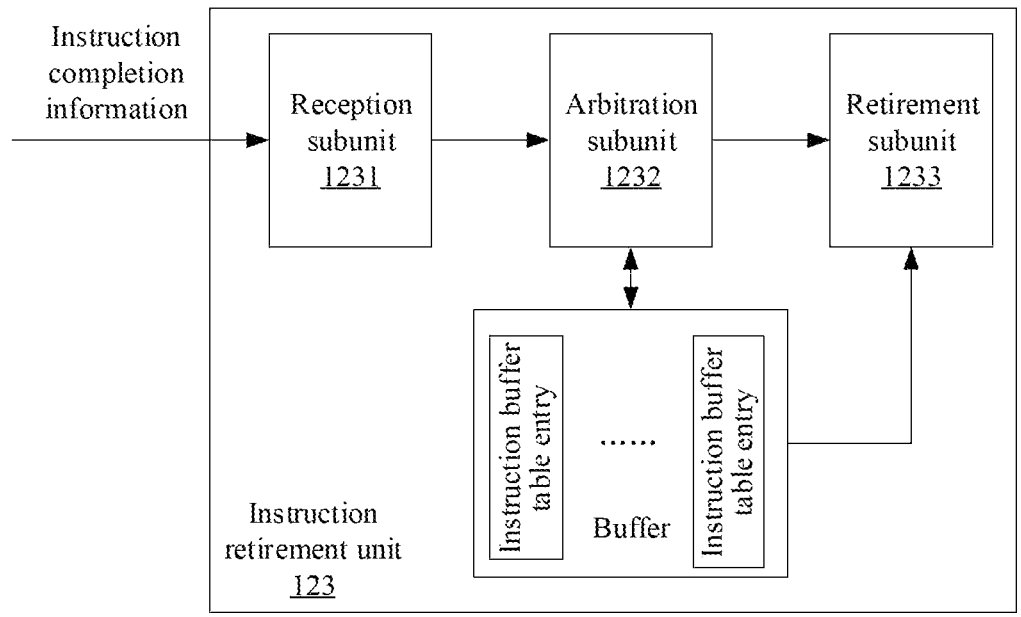
FIG. 4 is a schematic diagram of an instruction retirement unit according to an embodiment of the present application.

FIG. 4 is a schematic diagram of an internal structure according to an instruction retirement unit according to an embodiment of the present application. As shown in FIG. 4, the instruction retirement unit 123 includes a reception subunit 1231, an arbitration subunit 1232 and a retirement subunit 1233. The reception subunit 1231 may receive a completion request signal sent from the instruction execution unit 121 for instructions to be completed. The arbitration subunit 1232 may respond to the completion request signal that the reception subunit 1231 receives, and after determining, based on a new-old relationship between a retired instruction and an instruction to be completed, that the instructions to be completed can be completed, may send, to the instruction execution unit 121, a completion permission signal for the instruction to be completed, receive the instruction completion information of the instruction to be completed sent from the instruction execution unit 121, and store the instruction completion information of the instruction to be completed into the instruction buffer table entries in a buffer. The retirement subunit 1233 may perform, based on the instruction completion information stored in each of the instruction buffer table entries, retirement processing on the instructions to be retired that have already been completed and have not been retired, and delete the instruction completion information of the retired instructions from the instruction buffer table entries. Herein, the number of the instruction buffer table entries in the buffer is greater than 1 and less than the out-of-order degree allowed by the processing unit 12, and each of the instruction buffer table entries may store the instruction completion information of one instruction.

Whether an instruction can be completed is determined by the instruction execution unit 121. In a case where the instruction execution unit 121 determines that an instruction it executes can be completed, this instruction is treated as the instruction to be completed, and the instruction execution unit 121 sends the completion request signal for the instruction to the instruction retirement unit 123. After determining that the instruction to be completed can be completed, the arbitration subunit 1232 sends a completion permission signal to the instruction execution unit 121. After receiving the completion permission signal, the instruction execution unit 121 sends the instruction completion information of the instruction to be completed to the instruction retirement unit 123, to realize the completion of the instruction.

Instruction completion is a phase after instruction execution, and the instruction that can be completed is an instruction that can be executed normally to obtain an execution result. When determining that an instruction can be executed normally, the instruction execution unit 121 can initiate a completion request for the instruction. Thus, an instruction to be completed is not necessarily an instruction that has been already executed. After the instruction execution unit 121 starts to execute an instruction, it can determine whether the instruction can be executed normally. If the instruction execution unit 121 determines that the instruction can be executed normally, the instruction execution unit 121 can initiate a completion request for the instruction.

After the instruction to be completed is allowed to be completed, the instruction execution unit 121 sends the instruction completion information of the instruction to be completed to the instruction retirement unit 123, which in turn is stored by the arbitration subunit 1232 into the instruction buffer table entries, for use by the retirement subunit 1233 when performing retirement processing on the instruction. The instruction completion information includes information such as the length of the instruction, whether the flag bit of the instruction will be updated, and whether the instruction will generate an exception.

The buffer is located in the instruction retirement unit 123. The number of the instruction buffer table entries in the buffer is greater than 1 and less than the out-of-order degree allowed by the processing unit 12, and each of the instruction buffer table entries may store the instruction completion information of one instruction at the same time. The out-of-order degree of the processing unit 12 is equal to the upper limit of the number of instructions allowed in the instruction execution unit 121, i.e., the upper limit of the number of instructions in the instruction execution unit 121 that are in the dispatching phase to the retirement phase. For example, the out-of-order degree of the instruction execution unit 121 is 64, the upper limit of the number of unretired instructions in the instruction execution unit 121 is 64, and the number of the instruction buffer table entries in the buffer is greater than 1 and less than 64, e.g., the number of the instruction buffer table entries is 4.

It should be understood that, the number of the instruction buffer table entries in the buffer affects the number of instructions which have been completed and have not been retired, and thus affects the performance of the processing unit 12. Meanwhile, the number of the instruction buffer table entries also affects the resource consumption of the maintenance of the buffer. By setting a reasonable number of the instruction buffer table entries, the performance and resource consumption of the processing unit 12 can be balanced.

The arbitration subunit 1232 determines, based on the new-old relationship between the retired instructions and the instructions to be complete, whether the instructions to be completed can be completed, and after determining that the instructions to be completed can be completed, stores the instruction completion information of the instructions to be completed into the instruction buffer table entries. Since the number of the instruction buffer table entries is less than the out-of-order degree allowed by the processing unit 12, the arbitration subunit 1232 controls the instructions to be completed in order, and stores the instruction completion information of the completed instructions into the instruction buffer table entries, so as to avoid that the completed instructions cannot be retired and keep occupying the instruction buffer table entries, resulting in that other instructions cannot be completed and thus this cycle causes the pipeline to be blocked.

In the embodiments of the present application, the number of the instruction buffer table entries in the buffer is less than the out-of-order degree of the processing unit 12. The arbitration subunit 1232 enables the instructions to be completed in order, and stores the instruction completion information of the completed instructions into the instruction buffer table entries. The retirement subunit 123 performs retirement processing on the instructions to be retired based on the instruction completion information in the instruction buffer table entries, and deletes the instruction completion information of the retired instructions from the instruction buffer table entries. Since the instruction buffer table entries store the instruction completion information of the instructions that have already been completed and have not been retired, or being retired, the instructions take up the instruction buffer table entries only at the execution and retirement phases. Therefore, the buffer only needs to include less instruction buffer table entries to satisfy the out-of-order execution of the processing unit 12, but maintaining less instruction buffer table entries can reduce the consumption of hardware resources for the instruction reordering part when the processing unit 12 performs the out-of-order processing.

In one possible implementation, the buffer includes N instruction buffer table entries, and N is an integer greater than or equal to 2. In order to avoid a sending pipeline to be blocked, the buffer stores the instruction completion information of N older instructions other than the retired instructions, and each of the instruction buffer table entries stores the instruction completion information of an instruction. After the reception subunit 1231 receives the completion request signal for the instruction to be completed, the arbitration subunit 1232 determines whether the instruction to be completed is included in the N older instructions other than the retired instructions. If so, the arbitration subunit 1232 allows it to be completed and sends a completion permission signal to the instruction execution unit 121, so that the instruction execution unit 121 sends the instruction completion information of the instruction to be completed and stores the instruction completion information of the instruction to be completed into the instruction buffer table entries.

Figure 5:
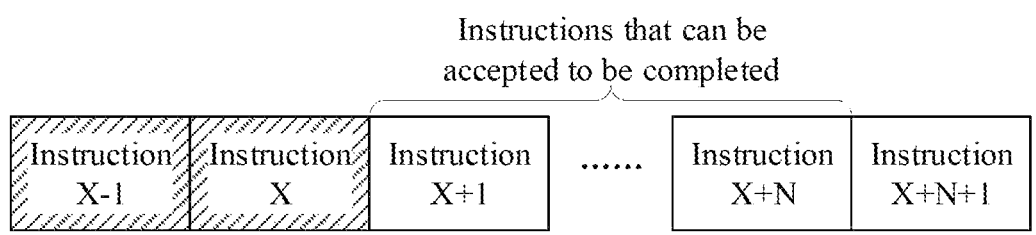
FIG. 5 is a schematic diagram of instructions that can be accepted to be completed according to an embodiment of the present application.

FIG. 5 is a schematic diagram of instructions that can be accepted to be completed according to an embodiment of the present application. As shown in FIG. 5, instruction X−1 to instruction X+N+1 are sequence instructions in an instruction packet, instruction X and all the preceding instructions have been retired. In a case where the number of the instruction buffer table entries is equal to N, the instructions that can be accepted to be completed are instruction X+1 to instruction X+N, i.e., other than the retired instructions 1 to X, the N older instructions are instruction X+1 to instruction X+N. A completion request initiated by any of instructions X+1 to instruction X+N would be accepted by the arbitration subunit 1232, while the completion request initiated by the instructions other than instruction X+1 to instruction X+N would not be accepted by the arbitration subunit 1232. In FIG. 5, the instructions illustrated by the rectangular blocks with diagonal shading are retired instructions, and the instructions illustrated by the rectangular blocks without diagonal shading are unretired instructions.

For example, the number of the instruction buffer table entries is 4, and the instruction packet includes instruction 1 to instruction 64 in instruction sequence (the new-old relationship of the instructions). Instruction 1 and instruction 2 are retired, then 4 older instructions other than instruction 1 and instruction 2 are instruction 3 to instruction 6. If any of instruction 3 to instruction 6 initiates a completion request, the arbitration subunit 1232 allows that instruction to be completed. If any instruction other than instruction 3 to instruction 6, e.g., instruction 7, initiates a completion request, the arbitration subunit 1232 rejects that instruction to be completed.

It should be understood that, in a case where any of N older instructions other than the retired instructions initiates a completion request, the arbitration subunit 1232 performs the completion of that instruction, i.e., the N instructions are not necessarily completed in accordance with the new-old relationship, and some or all of the N instructions may initiate a completion request simultaneously. For example, the N older instructions other than the retired instructions are instruction 3 to instruction 6, then there is no restriction for the completion order of instruction 3 to instruction 6.

In the embodiment of the present application, since the instructions need to be retired in order, the arbitration subunit 1232 allows the N older instructions other that the retired instructions according to the retired instructions, i.e., the buffer may store the instruction completion information of the N older instructions other that the retired instructions, to avoid that the subsequent instructions take up the instruction buffer table entries and the preceding instructions cannot be completed. That the preceding instructions cannot be completed causes that the completed instructions cannot be retired or empty out the instruction buffer table entries, so the cycle results in pipeline blocking. Therefore, the performance and reliability of the processing unit 12 are ensured while reducing the consumption of resources of the processing unit 12.

In a possible implementation, the N instruction buffer table entries included in the buffer are used to store the instruction completion information of different instructions, and the i-th instruction buffer table entry among the N instruction buffer table entries is used to store the instruction completion information of an i+kN-th instruction in the instruction sequence, wherein k is a non-negative integer.

For example, in a case where the buffer includes 4 instruction buffer table entries from instruction buffer table entry 1 to instruction buffer table entry 4, i.e., N is equal to 4, instruction buffer table entry 1 is used to store the instruction completion information of instruction 1+4k, instruction buffer table entry 2 is used to store the instruction completion information of instruction 2+4k, instruction buffer table entry 3 is used to store the instruction completion information of instruction 3+4k, and then instruction buffer table entry 4 is used to store the instruction completion information of instruction 4+4k, wherein k is a non-negative integer, such as 0, 1, 2. In a case where the out-of-order degree allowed by the processing unit 12 is 64, instructions corresponding to the instruction completion information stored in instruction buffer table entry 1 to instruction buffer table entry 4 are shown in Table 1 below.

TABLE 1

| instruction buffer table entry 1 | instruction buffer table entry 2 | instruction buffer table entry 3 | instruction buffer table entry 4 |
|---|---|---|---|
| instruction 1 | instruction 2 | instruction 3 | instruction 4 |
| instruction 5 | instruction 6 | instruction 7 | instruction 8 |
| instruction 9 | instruction 10 | instruction 11 | instruction 12 |
| instruction 13 | instruction 14 | instruction 15 | instruction 16 |
| instruction 17 | instruction 18 | instruction 19 | instruction 20 |
| instruction 21 | instruction 22 | instruction 23 | instruction 24 |
| instruction 25 | instruction 26 | instruction 27 | instruction 28 |
| instruction 29 | instruction 30 | instruction 31 | instruction 32 |
| instruction 33 | instruction 34 | instruction 35 | instruction 36 |
| instruction 37 | instruction 38 | instruction 39 | instruction 40 |
| instruction 41 | instruction 42 | instruction 43 | instruction 44 |
| instruction 45 | instruction 46 | instruction 47 | instruction 48 |
| instruction 49 | instruction 50 | instruction 51 | instruction 52 |
| instruction 53 | instruction 54 | instruction 55 | instruction 56 |
| instruction 57 | instruction 58 | instruction 59 | instruction 60 |
| instruction 61 | instruction 62 | instruction 63 | instruction 64 |

It should be noted that, each of the instruction buffer table entries can only store the instruction completion information of one instruction at the same time, and the instruction completion information of the next instruction can be stored in the instruction buffer table entry only after the instruction completion information of the previous instruction is deleted from the instruction buffer table entry. For example, for instruction buffer table entry 1 in Table 1 above, when the instruction completion information of instruction 1 is in instruction buffer table entry 1, the instruction completion information of instruction 5 cannot be stored in instruction buffer table entry 1. At the moment, the completion request for instruction 5 will not be accepted by the arbitration subunit 1232. After instruction 1 is retired, the instruction completion information of instruction 1 is deleted from instruction buffer table entry 1, and then the instruction completion information of instruction 5 can be stored in instruction buffer table entry 1. At the moment, the completion request for instruction 5 would be accepted by the arbitration subunit 1232.

For the i-th instruction buffer table entry in respective instruction buffer table entries, if the i-th instruction buffer table entry stores the instruction completion information of i+kN-th instruction, after the instruction completion information of the i+kN-th instruction is retired, the arbitration subunit 1232 will match the instruction identifier of i+(k+1)N-th instruction to the i-th instruction buffer table entry, to indicate that the i-th instruction buffer table entry may store the instruction completion information of the i+(k+1)N-th instruction currently, thus the completion request for the the i+(k+1)N-th instruction can be accepted by the arbitration subunit 1232.

In the embodiments of the present application, N instruction buffer table entries included in the buffer are used to store the instruction completion information of different instructions, and each of the instruction buffer table entries is used to store the instruction completion information of instructions in the instruction sequence, in which each instruction is separated from its preceding instructions by N-1 instructions, so that the instruction completion information of adjacent instructions in the instruction sequence are stored in different instruction buffer table entries. This can shorten the waiting time of instruction completion, improve the efficiency of instruction completion and retirement, and ensure the performance of the processing unit 12 while reducing the resource consumption of the processing unit 12.

In a possible implementation, for each instruction to be retired that has already been completed and has not been retired, the retirement subunit 1233 may determine, based on the instruction completion information of the instruction to be retired in the instruction buffer table entry, whether the preceding instructions for the instruction to be retired have already been retired or completed and will not cause a speculation failure. If the preceding instructions for the instruction to be retired have already been retired or have not been retired but completed and will not cause a speculation failure, retirement processing is performed on the instruction to be retired and the unretired preceding instructions in order, and the instruction completion information of the retired instruction is deleted from the instruction buffer table entry.

For example, after storing the instruction completion information of instruction 5 into the buffer table entry, the retirement subunit 1233 determines whether each preceding instruction for instruction 5 is retired or have not been retired but completed and will not cause a speculation failure. If each preceding instruction for instruction 5 has already been retired or has not been retired but completed and will not cause a speculation failure, retirement processing can be performed on instruction 5. If an instruction that is unretired but completed and will not cause a speculation failure exists in the preceding instructions for instruction 5, retirement processing can be performed in the same time on the instruction that is unretired but completed and will not cause a speculation failure. For example, if instruction 1 to instruction 3 in the preceding instructions for instruction 5 have already been retired, and instruction 4 has been completed and will not cause a speculation failure, retirement processing is performed on instruction 4 and instruction 5 in order.

For any instruction to be retired, if an uncompleted instruction exists in the preceding instructions for the instruction to be retired, it is necessary to wait until all the preceding instructions for the instruction to be retired are completed, to determine, based on whether each preceding instruction causes a speculation failure, whether the instruction to be retired can be retired normally.

In the embodiments of the present application, the retirement subunit 1233 performs retirement processing on the completed instructions that will not cause a speculation failure in order, and deletes the instruction completion information of the retired instruction in the instruction buffer table entry, so that the instruction completion information of the subsequent instructions can be stored in the instruction buffer table entry, to enable the subsequent instructions to be completed in order and restore the execution order of the instructions. Therefore, correct overall execution behavior is ensured.

In a possible implementation, for each instruction to be retired that has already been completed and has not been retired, the retirement subunit 1233 may determine, based on the instruction completion information of the instruction to be retired in the instruction buffer table entry, whether a completed instruction that causes a speculation failure exists in the preceding instructions for the instruction to be retired. If a completed instruction that causes a speculation failure exists in the preceding instructions for the instruction to be retired, the retirement subunit 1233 performs retirement processing on the completed instruction that caused the speculation failure, generates a pipeline flushing operation, sends a pipeline flushing request to the instruction execution unit 121, and deletes the instruction completion information of the retired instruction and the completed instruction on a wrong path from the instruction buffer entry.

For example, when the retirement subunit 1233 performs retirement processing on instruction 5, the retirement subunit 1233 will determine whether each completed instruction prior to instruction 5 will cause a speculation failure. After instruction 3 that will cause the speculation failure is completed, the retirement subunit 1233 performs retirement processing on instruction 3, generates a pipeline flushing operation, and sends a pipeline flushing request to the instruction execution unit 121, so that the speculation instructions on the wrong path will not produce an execution effect. If a speculation instruction on the wrong path is completed, the instruction completion information of the speculation instruction on the wrong path is deleted from the instruction buffer entry.

In the embodiment of the present application, when an instruction that causes a speculation failure exists in in the preceding instructions for the completed instruction and is completed, the retirement subunit 1233 performs retirement processing on the speculation failure instruction that causes the speculation failure, and generates a pipeline flushing operation, and sends a pipeline flushing request to the instruction execution unit 121, so that the speculation instruction on the wrong path does not produce an execution effect. If the speculation instruction on the wrong path has been completed, the instruction completion information of the speculation instruction on the wrong path is deleted from the instruction buffer entry, so that the instruction that is retired must be an instruction on a correct path, which ensures the correctness of the overall execution behavior.

Figure 6:
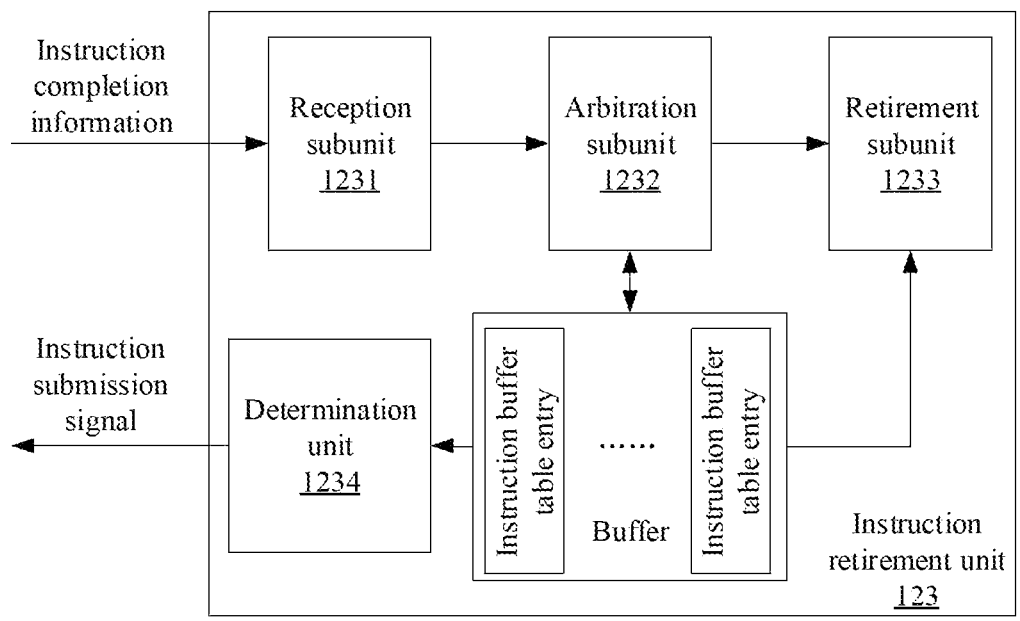
FIG. 6 is a schematic diagram of an instruction retirement unit according to another embodiment of the present application.

FIG. 6 is a schematic diagram of an interior structure of an instruction retirement unit 123 according to another embodiment of the present application. As shown in FIG. 6, the instruction retirement unit 123 further includes a determination subunit 1234. The determination subunit 1234 can determine a currently submittable instruction based on the instruction completion information stored in each of the instruction buffer table entries, wherein all the preceding instructions for the currently submittable instruction have been retired or have not been retired but completed and will not cause a speculation failure. After determining the currently submittable instruction, the determination subunit 1234 may send an instruction submission signal to the instruction execution unit 121 based on the currently submittable instruction, and the instruction execution unit 121 that receives the instruction submission signal can submit the currently submittable instruction and the preceding instructions for the currently submittable instruction according to the instruction submission signal.

The determination subunit 1234 can determine, based on the instruction completion information stored in each of the instruction buffer table entries, an instruction whose preceding instructions have already been retired or have not been retired but completed and will not cause a speculation failure, as the currently submittable instruction. The currently submittable instructions may be an uncompleted instruction. Since an instruction that can be retired is an instruction whose preceding instructions have already been retired or have not been retired but completed and will not cause a speculation failure, the currently submittable instruction is the next instruction of the last instruction that can be retired.

Figure 7:
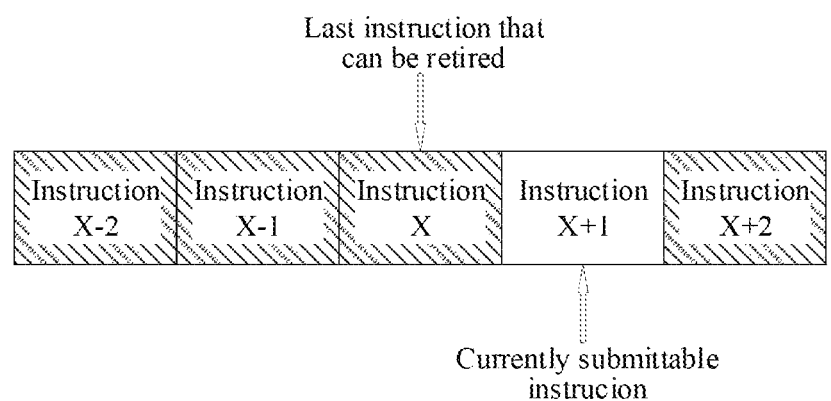
FIG. 7 is a schematic diagram of a currently submittable instruction according to an embodiment of the present application.

FIG. 7 is a schematic diagram of a currently submittable instruction according to an embodiment of the present application. As shown in FIG. 7, instruction X is the last instruction that can be retired, and instruction X+1 is the currently submittable instruction. In FIG. 7, the instructions illustrated by the rectangular blocks with diagonal shading are completed instructions, and the instruction illustrated by the rectangular blocks without diagonal shading is uncompleted instruction, that is, instruction X-2, instruction X-1, instruction X and instruction X+2 are completed instructions, while instruction X+1 is uncompleted instruction.

In the embodiments of the present application, the determination subunit 1234 determines the currently submittable instruction based on the instruction completion information stored in each of the instruction buffer table entries, and after the determination subunit 1234 sends an instruction submission signal to the instruction execution unit 121 based on the currently submittable instruction, the instruction execution unit 121 can submit the currently submittable instructions and its preceding instructions. Since the preceding instructions of the currently submittable instruction. Since the preceding instructions for the currently submittable instructions have already been retired or have not been retired but completed and will not cause a speculation failure, the instructions submitted are guaranteed to be instructions on the correct path, thus ensuring the correctness of overall execution behavior.

Instruction Execution Unit

Figure 8:
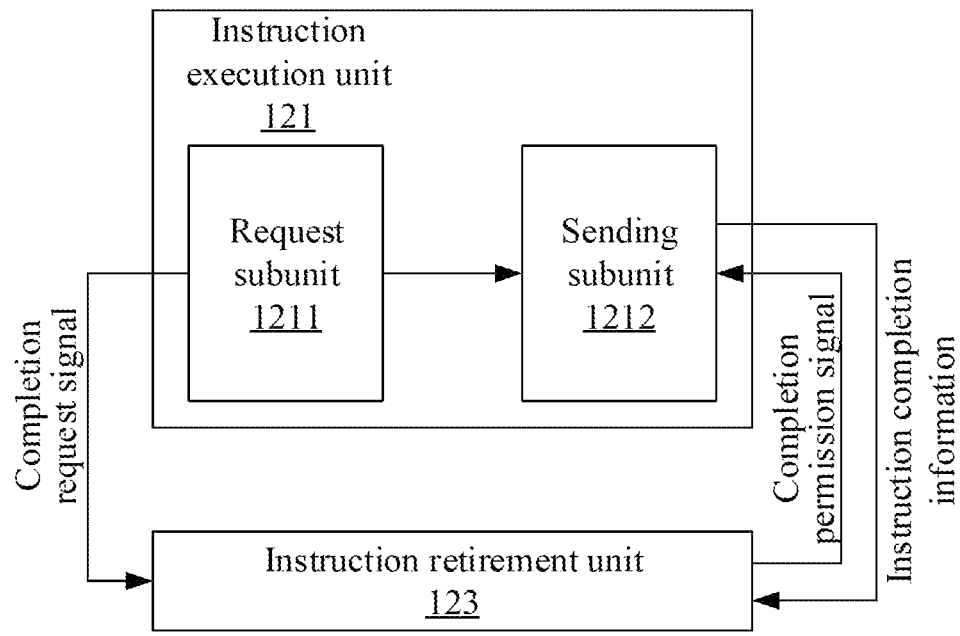
FIG. 8 is a schematic diagram of an instruction execution unit according to an embodiment of the present application.

FIG. 8 is a schematic diagram of an interior structure of an instruction execution unit according to an embodiment of the present application. As shown in FIG. 8, the instruction execution unit 121 includes a request subunit 1211 and a sending subunit 1212. In a case where it is determined that an instruction executed by the instruction execution unit 121 can be completed, the request subunit 1211 can send a completion request signal for the instruction to be completed to the instruction retirement unit 123, to request the completion of the instruction to be completed. In a case where the instruction retirement unit 123 determines that the instruction to be completed can be completed, the instruction retirement unit 123 sends a completion permission signal to the instruction execution unit 121. After receiving the completion permission signal, the sending subunit 1212 will send the instruction completion information of the instruction to be completed to the instruction retirement unit 123. The instruction retirement unit 123 stores the instruction completion information into the instruction buffer table entries in the buffer, and then the instruction retirement unit 123 performs, based on the instruction completion information stored in each of the instruction buffer table entries, retirement processing on the instructions to be retired that are completed and unretired, and deletes the instruction completion information of the retired instructions from the instruction buffer table entries. Herein, the number of the instruction buffer table entries in the buffer is greater than 1 and less than the out-of-order degree allowed by the processing unit 12, and each of the instruction buffer table entries may store the instruction completion information of one instruction.

After the instruction execution unit 121 starts executing an instruction, the request subunit 1211 can determine whether the instruction can be completed. If it is determined that the instruction can be completed, the request subunit 1211 sends a completion request signal for the instruction to the instruction retirement unit 123. If it is determined that the instruction cannot be completed temporarily, the request subunit 1211 sends the completion request signal to the instruction retirement unit 123 after waiting until the instruction is completed. After the request subunit 1211 sends the completion request signal to the instruction retirement unit 123, if no completion permission signal sent from the instruction retirement unit 123 is received, it means that the instruction retirement unit 123 determines that the instruction to be completed cannot be completed yet. The request subunit 1211 needs to subsequently re-conduct the completion of the instruction to be completed.

In the embodiments of the present application, the number of the instruction buffer table entries is smaller than the out-of-order degree allowed by the processing unit 12, the request subunit 1211 sends the instruction completion information to the instruction retirement unit 123, the instruction retirement unit 123 stores the instruction completion information into the instruction buffer table entries, to achieve the completion of the instruction. Furthermore, the instruction retirement unit 123 can perform retirement processing on the instructions to be retired based on the instruction completion information in the instruction buffer table entries, and delete instruction completion information of retired instructions from the instruction buffer table entries. Since the instruction buffer table entries store the instruction completion information of the instructions that are completed and unretired or being retired, the instructions take up the instruction buffer table entries only at the execution and retirement phases. Therefore, the buffer only needs to include less instruction buffer table entries to satisfy the out-of-order execution of the processing unit 12, and maintaining the less instruction buffer table entries can reduce the consumption of resources of the processing unit 12.

Figure 9:
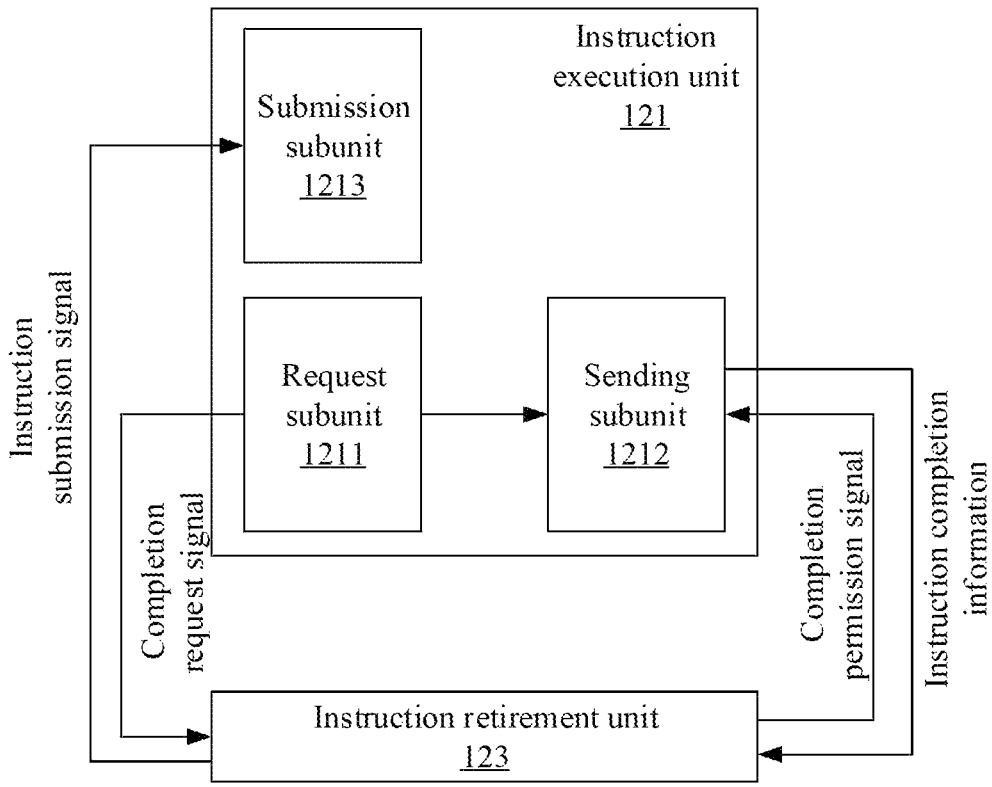
FIG. 9 is a schematic diagram of an instruction execution unit according to another embodiment of the present application.

FIG. 9 is a schematic diagram of an interior structure of an instruction execution unit according to another embodiment of the present application. As shown in FIG. 9, the instruction execution unit 121 further includes a submission subunit 1213. The submission subunit 1213 can receive an instruction submission signal from the instruction retirement unit 123, and submit a currently submittable instruction corresponding to the instruction submission signal and preceding instructions for the currently submittable instruction. Herein, the preceding instructions for the currently submittable instruction have already been retired or have not been retired but completed and will not cause a speculation failure.

The instruction retirement unit 123 can determine the currently submittable instructions based on the instruction completion information stored in each of the instruction buffer table entries, and broadcast the instruction submission signal to the instruction execution unit 121 based on the currently submittable instruction. After receiving the instruction submission signal, the instruction execution unit 121 submits the currently submittable instruction and the preceding instructions for the currently submittable instruction.

In the embodiments of the present application, since the currently submittable instructions is determined based on the instruction completion information in each of the instruction buffer table entries, and the preceding instructions for the currently submittable instruction have already been retired or have not been retired but completed and will not cause a speculation failure, the currently submittable instruction and the preceding instructions for the currently submittable instruction are all instructions on a correct path, thus the correctness of the overall execution behavior can be ensured.

In one possible implementation, the instruction submission signal includes an instruction identifier of the currently submittable instruction. The instruction identifier of the instruction is obtained in response to the instruction being dispatched, and the instruction identifier can indicate the new-old relationship of instructions. That is, the new-old relationship of instructions can be determined according to the instruction identifier. The submission subunit 1213 can acquire the instruction identifier of the instruction to be submitted that initiates a submission request, and compare the instruction identifier of the instruction to be submitted with the instruction identifier of the currently submittable instruction. If the instruction identifier of the instruction to be submitted is older than or equal to the instruction identifier of the currently submittable instruction, the instruction to be submitted is submitted. If the instruction identifier of the instruction to be submitted is newer than the instruction identifier of the currently submittable instruction, the instruction to be submitted is not submitted.

The instruction dispatching unit assigns an instruction identifier to each instruction in response to the instruction dispatching unit converting the instructions from an in-order state to an out-of-order state. The instruction identifier is a unique identifier of an instruction in a pipeline, and the new-old relationship of different instructions can be determined by comparing the instruction identifiers. The instruction identifiers can be incremented or decremented per the instruction sequence. In response to the instruction identifier being incremented per the instruction sequence, the instruction with the larger instruction identifier is newer than the instruction with the smaller instruction identifier. in response to the instruction identifier being decremented per the instruction sequence, the instruction with the larger instruction identifier is older than the instruction with the smaller instruction identifier.

In the embodiments of the present application, the submission subunit 1213 determines the new-old relationship of instructions based on the instruction identifiers. If an instruction is older than the currently submittable instruction, the instruction is submitted. If an instruction has the same instruction identifier as the currently submittable instruction, it indicates that the instruction is the currently submittable instruction, and thus the instruction is submitted. If an instruction is newer than the currently submittable instruction, the instruction is not submitted temporarily. The new-old relationship of instructions is determined through the instruction identifiers, and then the submittable instruction can be determined. It is guaranteed that the submittable instructions are on the correct path, and hence the correctness of the overall execution behavior is ensured.

Figure 10:
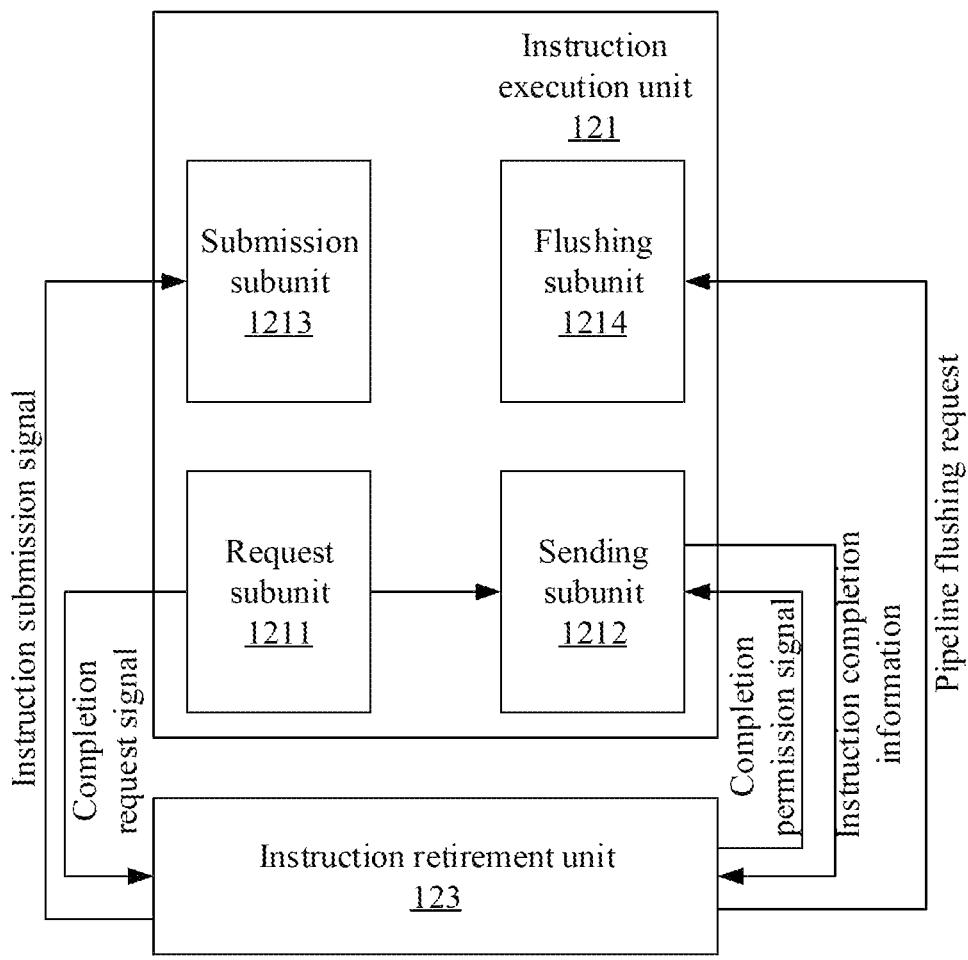
FIG. 10 is a schematic diagram of an instruction execution unit according to yet another embodiment of the present application.

FIG. 10 is a schematic diagram of an interior structure of an instruction execution unit according to yet another embodiment of the present application. As shown in FIG. 10, the instruction execution unit 121 further includes a flushing subunit 1214. The flushing subunit 1214 can respond to a pipeline flushing request from the instruction retirement unit 123, and perform pipeline flushing on the instruction execution unit 121 through the first flushing mode and/or the second flushing mode based on the execution delay and architecture of the instruction execution unit 121. Herein, the first flushing mode eliminates speculation instructions on an error path before the instruction is executed, and the second flushing mode makes speculation instructions on an error path not to produce an execution effect.

The first flushing mode eliminates the speculation instructions on the error path before the instruction is executed, so it is not necessary to wait until all the instructions in the instruction execution unit 121 are executed, to perform the pipeline flushing, thus shortening the time of each pipeline flushing. However, the first flushing mode requires that the new-old relationship of the instructions is determined before the instructions are executed. For this reason, there is a mandatory requirement for the architecture of the instruction execution unit 121. For example, the instruction execution unit 121 that processes instructions in order may perform pipeline flushing by the first flushing mode, while the instruction execution unit 121 that processes instructions out of order cannot perform pipeline flushing merely by the first flushing mode.

The second flushing mode can make the speculation instructions on the error path not to produce an execution effect, and after all the instructions in the instruction execution unit 121 are executed, may determine the new-old relationship of the instructions based on the execution result, therefore it is suitable for the instruction execution unit 121 of various architectures. However, since the second flushing mode needs to determine the new-old relationship of the instructions after the instructions are executed, if there exists a long-delay instruction, the instruction execution unit 121 needs to consume more time to execute the long-delay instruction, and hence it needs more time to complete the pipeline flushing. However, during the pipeline flushing, the preceding stage cannot send a new instruction to the instruction execution unit 121, resulting in execution cavitation in the processing unit 12 which in turn affects the performance of the processing unit 12.

In the embodiments of the present application, in a case where there is a speculation failure, the instruction retirement unit 123 sends a pipeline flushing request to the instruction execution unit 121. In response to the pipeline flushing request, the flushing subunit 1214 performs, based on the execution delay and architecture of the instruction execution unit 121, pipeline flushing on the instruction execution unit 121 through the first flushing mode and/or the second flushing mode. The first flushing mode eliminates speculation instructions on the error path before the instruction is executed, thus the flushing speed of the pipeline is faster, but it is only suitable for instruction execution units of some types of architectures. However, the second flushing mode can make the speculation instructions on the error path not to produce an execution effect, and is suitable for instruction execution units of all types of architectures. Therefore, the flushing subunit 1214 can perform, based on the execution delay and architecture of the instruction execution unit 121, pipeline flushing on the instruction execution unit 121 through the first flushing mode and/or the second flushing mode. Because the pipeline flushing can be performed on instruction execution units of various types of architectures, the flushing speed of the pipeline can be improved and thus the efficiency of pipeline flushing can be improved.

Instruction Processing Method

Figure 11:
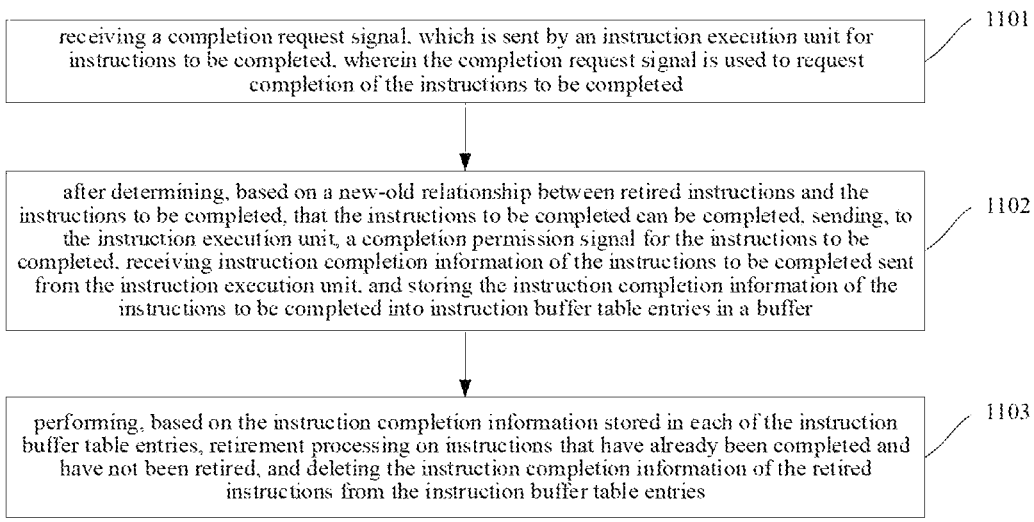
FIG. 11 is a flow chart of the instruction processing method according to an embodiment of the present application.

FIG. 11 is a flow chart of an instruction processing method according to an embodiment of the present application. The instruction processing method may be executed by the instruction retirement unit 123 in the above embodiments. As shown in FIG. 11, the instruction processing method includes:

Step 1101, receiving a completion request signal, which is sent by an instruction execution unit for instructions to be completed, wherein the completion request signal is used to request completion of the instructions to be completed;

Step 1102, after determining, based on a new-old relationship between retired instructions and the instructions to be completed, that the instructions to be completed can be completed, sending, to the instruction execution unit, a completion permission signal for the instructions to be completed, receiving instruction completion information of the instructions to be completed sent from the instruction execution unit, and storing the instruction completion information of the instructions to be completed into instruction buffer table entries in a buffer, wherein a number of the instruction buffer table entries in the buffer is greater than 1 and less than an out-of-order degree allowed by a processing unit, and each of the instruction buffer table entries may store the instruction completion information of one instruction; and Step 1103, performing, based on the instruction completion information stored in each of the instruction buffer table entries, retirement processing on instructions that have already been completed and have not been retired, and deleting the instruction completion information of the retired instructions from the instruction buffer table entries.

In the embodiments of the present application, the number of the instruction buffer table entries in the buffer is smaller than the out-of-order degree allowed by the processing unit. By completing instructions in order, the instruction completion information of the completed instructions are stored into the instruction buffer table entries, retirement processing is performed on the instructions to be retired, based on the instruction completion information in the instruction buffer table entries, and the instruction completion information of retired instructions are deleted from the instruction buffer table entries. Since the instruction buffer table entries store the instruction completion information of the completed and unretired instructions or instructions being retired, the instructions take up the instruction buffer table entries only at the execution and retirement phases. Therefore, the buffer only needs to include less instruction buffer table entries to satisfy the out-of-order execution of the processing unit, and maintaining the less instruction buffer table entries can reduce the consumption of resources of the processing unit.

In one possible implementation, the buffer includes N instruction buffer table entries. In response to completing an instruction, it can be determined whether N older instructions other than the retired instructions include the instructions to be completed. If the N older instructions other than the retired instructions include the instructions to be completed, the completion permission signal for the instructions to be completed is sent to the instruction execution unit, the instruction completion information of the instructions to be completed sent from the instruction execution unit is received, and the instruction completion information of the instructions to be completed are stored into the instruction buffer table entries in the buffer.

In one possible implementation, the N instruction buffer table entries are used to store the instruction completion information of different instructions, and the i-th instruction buffer table entry among the N instruction buffer table entries is used to store the instruction completion information of an i+kN-th instruction of an instruction sequence, wherein k is a non-negative integer.

In one possible implementation, when retirement processing is performed on an instruction, for each of the instructions to be retired, if it is determined based on the instruction completion information of the instruction to be retired in the instruction buffer table entries that preceding instructions for the instruction to be retired are already retired or completed and will not cause speculation failure, the retirement processing is performed on the instruction to be retired and unretired preceding instructions successively, and the instruction completion information of the retired instructions are deleted from the instruction buffer table entries.

In one possible implementation, when retirement processing is performed on an instruction, for each of the instructions to be retired, if it is determined, based on the instruction completion information of the instruction to be retired in the instruction buffer table entries, that there are completed instructions causing the speculation failure among instructions prior to the instruction to be retired, the retirement processing is performed on the completed instructions causing the speculation failure, a pipeline flushing request is sent to the instruction execution unit, and the instruction completion information of the retired instructions and completed instructions located on an error path are deleted from the instruction buffer table entries.

In one possible implementation, the instruction processing method further includes: determining a currently submittable instruction based on the instruction completion information stored in each of the instruction buffer table entries, and sending an instruction submission signal to the instruction execution unit based on the currently submittable instruction, so that the instruction execution unit submits, based on the instruction submission signal, the currently submittable instruction and preceding instructions for the currently submittable instruction, wherein the preceding instructions for the currently submittable instruction have already been retired or completed and will not cause the speculation failure.

Figure 12:
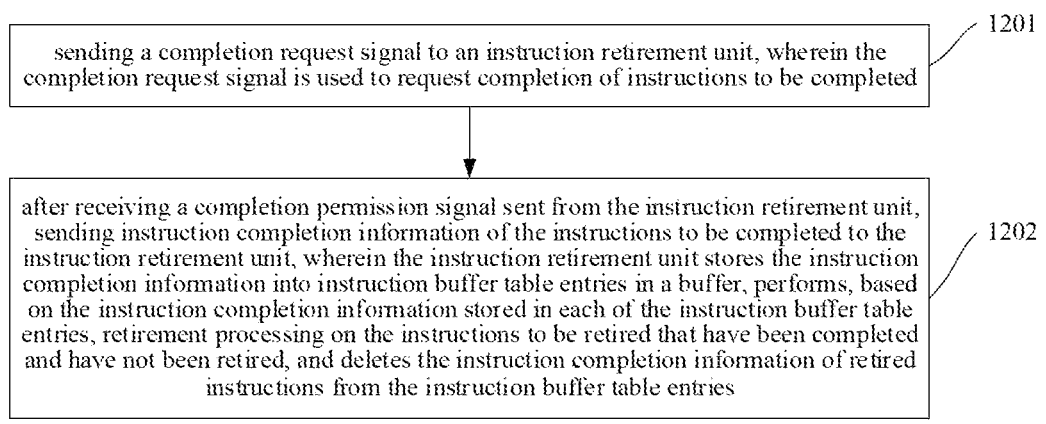
FIG. 12 is a schematic diagram of the instruction processing method according to yet another embodiment of the present application.

FIG. 12 is a flow chart of an instruction processing method according to yet another embodiment of the present application. The instruction processing method may be executed by the instruction execution unit 121 in the above embodiments. As shown in FIG. 12, the instruction processing method includes:

Step 1201, sending a completion request signal to an instruction retirement unit, wherein the completion request signal is used to request completion of instructions to be completed; and Step 1202, after receiving a completion permission signal sent from the instruction retirement unit, sending instruction completion information of the instructions to be completed to the instruction retirement unit, wherein the instruction retirement unit stores the instruction completion information into instruction buffer table entries in a buffer, performs, based on the instruction completion information stored in each of the instruction buffer table entries, retirement processing on the instructions to be retired that have already been completed and have not been retired, and deletes the instruction completion information of retired instructions from the instruction buffer table entries, wherein a number of the instruction buffer table entries in the buffer is greater than 1 and less than an out-of-order degree allowed by a processing unit, and each of the instruction buffer table entries may store the instruction completion information of one instruction.

In the embodiments of the present application, the number of the instruction buffer table entries in the buffer is smaller than the out-of-order degree allowed by the processing unit. By completing instructions in order, the instruction completion information of the completed instructions are stored into the instruction buffer table entries, retirement processing is performed on the instructions to be retired, based on the instruction completion information in the instruction buffer table entries, and the instruction completion information of retired instructions are deleted from the instruction buffer table entries. Since the instruction buffer table entries store the instruction completion information of the completed and unretired instructions or instructions being retired, the instructions take up the instruction buffer table entries only at the execution and retirement phases. Therefore, the buffer only needs to include less instruction buffer table entries to satisfy the out-of-order execution of the processing unit, and maintaining the less instruction buffer table entries can reduce the consumption of resources of the processing unit.

In one possible implementation, the instruction processing method further includes: receiving the instruction submission signal from the instruction retirement unit, and submitting the currently submittable instruction corresponding to the instruction submission signal and preceding instructions for the currently submittable instruction, wherein the preceding instructions for the currently submittable instructions have already been retired or completed and will not cause a speculation failure.

In one possible implementation, the instruction submission signal includes an instruction identifier of the currently submittable instruction. The instruction identifier of an instruction is obtained in response to the instruction being dispatched, and the instruction identifiers are used to indicate the new-old relationship of instructions. In response to submitting an instruction, the instruction identifier of the instruction to be submitted that initiates a submission request can be obtained. If the instruction identifier of the instruction to be submitted is older than or equal to the instruction identifier of the currently submittable instruction, the instruction to be submitted is submitted.

In one possible implementation, the instruction processing method further includes: in response to the pipeline flushing request from the instruction retirement unit, performing pipeline flushing on the instruction execution unit through the first flushing mode and/or the second flushing mode based on the execution delay and architecture of the instruction execution unit, wherein the first flushing mode eliminates speculation instructions on the error path before the instruction is executed, and the second flushing mode makes the speculation instructions on the error path not to produce an execution effect.

It should be noted that, since detailed description has been made in combination with the structure diagram to the details of the instruction processing method in the parts of the instruction retirement unit and the instruction execution unit of the above embodiments, and the specific processes can be referred to the description of the above embodiments of the instruction retirement unit and the instruction execution unit, and will not be repeated herein.

Computer Storage Medium

The application also provides a computer-readable storage medium, the computer-readable storage medium stores instructions for enabling a machine to execute an instruction processing method as described herein. Specifically, it is possible to provide a system or device equipped with a storage medium, software program codes that implement the functions of any of the above embodiments are stored in the storage medium, and enable the computer (or CPU or MPU) of the system or device to read and execute the program codes stored in the storage medium.

In this case, the program code read from the storage medium itself can realize the function of any of the above embodiments. Therefore, the program code and the storage medium storing the program code constitute a part of the application.

The storage medium embodiments for providing program code include floppy disk, hard disk, magneto-optical disk, optical disk (such as CD-ROM, CD-R, CD-RW, DVD-ROM, DVD-RAM, DVD-RW, DVD+RW), tape, non-volatile memory card, and ROM. Optionally, the program code can be downloaded from the server computer by the communication network.

Computer Program Product

The embodiment of the application also provides a computer program product, including computer instruction, the computer instruction indicate the computing device to perform any corresponding operation in the multiple method embodiments above.

Commercial Value of the Embodiments of the Present Application

In a case where the embodiments of the present application solve the problem of high resource consumption when the processing unit restores the execution order of instructions, the number of the instruction buffer table entries in the buffer is smaller than the out-of-order degree allowed by the processing unit. By completing instructions in order, the instruction completion information of the completed instructions are stored into the instruction buffer table entries, retirement processing is performed on the instructions to be retired, based on the instruction completion information in the instruction buffer table entries, and the instruction completion information of retired instructions are deleted from the instruction buffer table entries. Since the instruction buffer table entries store the instruction completion information of the completed and unretired instructions or instructions being retired, the instructions take up the instruction buffer table entries only at the execution and retirement phases. Therefore, the buffer only needs to include less instruction buffer table entries to satisfy the out-of-order execution of the processing unit, and maintaining the less instruction buffer table entries can reduce the consumption of resources of the processing unit.

It should be understood that each embodiment in this specification is described in progressive manner, and the same or similar parts of each embodiment can be referred to each other. Each embodiment focuses on the differences with other embodiments. In particular, the method embodiments are basically similar to the methods described in the device and system embodiment, so the description is relatively simple. Refer to the partial description of other embodiments for relevant points.

It should be understood that the specific embodiments of this specification have been described above. Other embodiments are within the scope of the claims. In some cases, the actions or steps recorded in the claims can be performed in a sequence of different embodiments and the desired results may still be achieved. In addition, the process depicted in the drawings does not necessarily require a particular order or a sequential order shown to achieve the desired result. In some embodiments, multitasking and parallel processing are also possible or may be advantageous.

It should be understood that element described in singular form herein or shown only one in the drawings do not mean the number of this element is limited to one. In addition, modules or elements described or shown as separate herein can be combined into a single module or element, and module or element described or shown as a single herein can be divided into multiple modules or elements.

It should also be understood that the terms and expressions used herein are only for description, at least one embodiments of this specification should not be limited to these terms and expressions. The use of these terms and expressions does not means the exclusion of any equivalent features of illustrations and descriptions (or parts thereof). It should be recognized that various possible modifications should also be included in the scope of claims. Other modifications, changes and replacements may also exist. Accordingly, the claims are deemed as cover all such equivalents.

What is claimed is:

1. A system comprising:
   at least one processor; and
   a memory communicatively connected with the at least one processor, wherein
   the memory stores processor instructions executable by the at least one processor, and the processor instructions, when executed by the at least one processor, cause an instruction retirement unit, of the at least one processor, to:
   receive a completion request signal, which is sent by an instruction execution unit for instructions to be completed, wherein the completion request signal is used to request completion of the instructions to be completed;
   after determining, based on a new-old relationship between retired instructions and the instructions to be completed, that the instructions to be completed can be completed, send, to the instruction execution unit, a completion permission signal for the instructions to be completed, receive instruction completion information of the instructions to be completed sent from the instruction execution unit, and store the instruction completion information of the instructions to be completed into instruction buffer table entries in a buffer, wherein a number of the instruction buffer table entries in the buffer is greater than 1 and less than an out-of-order degree allowed by the at least one processor, each of the instruction buffer table entries is used to store the instruction completion information of one instruction; and
   perform, based on the instruction completion information stored in each of the instruction buffer table entries, retirement processing on instructions that have already been completed and have not been retired, and delete the instruction completion information of the retired instructions from the instruction buffer table entries.

2. The system according to claim 1, wherein the buffer comprises N instruction buffer table entries; and
   the processor instructions, when executed by the at least one processor, further cause the instruction retirement unit to: determine whether N older instructions other than the retired instructions comprise the instructions to be completed, in a case where the N older instructions other than the retired instructions comprise the instructions to be completed, send, to the instruction execution unit, the completion permission signal for the instructions to be completed, receive the instruction completion information of the instructions to be completed sent from the instruction execution unit, and store the instruction completion information of the instructions to be completed into the instruction buffer table entries in the buffer.

3. The system according to claim 2, wherein the processor instructions, when executed by the at least one processor, further cause the instruction retirement unit to: determine a currently submittable instruction based on the instruction completion information stored in each of the instruction buffer table entries, and send an instruction submission signal to the instruction execution unit based on the currently submittable instruction, so that the instruction execution unit submits, based on the instruction submission signal, the currently submittable instruction and preceding instructions for the currently submittable instruction, wherein the preceding instructions for the currently submittable instruction have already been retired or completed and will not cause speculation failure.

4. The system according to claim 2, wherein the N instruction buffer table entries are used to store the instruction completion information of different instructions, and an i-th instruction buffer table entry among the N instruction buffer table entries is used to store the instruction completion information of an i+kN-th instruction of an instruction sequence, wherein k is a non-negative integer.

5. The system according to claim 4, wherein the processor instructions, when executed by the at least one processor, further cause the instruction retirement unit to: determine a currently submittable instruction based on the instruction completion information stored in each of the instruction buffer table entries, and send an instruction submission signal to the instruction execution unit based on the currently submittable instruction, so that the instruction execution unit submits, based on the instruction submission signal, the currently submittable instruction and preceding instructions for the currently submittable instruction, wherein the preceding instructions for the currently submittable instruction have already been retired or completed and will not cause speculation failure.

6. The system according to claim 1, wherein for each of the instructions to be retired, in a case where it is determined, based on the instruction completion information of an instruction to be retired in the instruction buffer table entries, that preceding instructions for the instruction to be retired have already been retired or completed and will not cause speculation failure, the processor instructions, when executed by the at least one processor, further cause the instruction retirement unit to: perform retirement processing on the instruction to be retired and unretired preceding instructions successively, and delete the instruction completion information of the retired instructions from the instruction buffer table entries.

7. The system according to claim 6, wherein the processor instructions, when executed by the at least one processor, further cause the instruction retirement unit to: determine a currently submittable instruction based on the instruction completion information stored in each of the instruction buffer table entries, and send an instruction submission signal to the instruction execution unit based on the currently submittable instruction, so that the instruction execution unit submits, based on the instruction submission signal, the currently submittable instruction and preceding instructions for the currently submittable instruction, wherein the preceding instructions for the currently submittable instruction have already been retired or completed and will not cause the speculation failure.

8. The system according to claim 6, wherein, for each of the instructions to be retired, in a case where it is determined, based on the instruction completion information of the instruction to be retired in the instruction buffer table entries, that there are completed instructions causing the speculation failure among instructions prior to the instruction to be retired, the processor instructions, when executed by the at least one processor, further cause the instruction retirement unit to: perform retirement processing on the completed instructions causing the speculation failure and send a pipeline flushing request to the instruction execution unit, and delete, from the instruction buffer table entries, the instruction completion information of the retired instructions and the instruction completion information of completed instructions located on an error path.

9. The system according to claim 8, wherein the processor instructions, when executed by the at least one processor, further cause the instruction retirement unit to: determine a currently submittable instruction based on the instruction completion information stored in each of the instruction buffer table entries, and send an instruction submission signal to the instruction execution unit based on the currently submittable instruction, so that the instruction execution unit submits, based on the instruction submission signal, the currently submittable instruction and preceding instructions for the currently submittable instruction, wherein the preceding instructions for the currently submittable instruction have already been retired or completed and will not cause the speculation failure.

10. The system according to claim 1, wherein the processor instructions, when executed by the at least one processor, further cause the instruction retirement unit to: determine a currently submittable instruction based on the instruction completion information stored in each of the instruction buffer table entries, and send an instruction submission signal to the instruction execution unit based on the currently submittable instruction, so that the instruction execution unit submits, based on the instruction submission signal, the currently submittable instruction and preceding instructions for the currently submittable instruction, wherein the preceding instructions for the currently submittable instruction have already been retired or completed and will not cause speculation failure.

11. A computing device, comprising:
the system according to claim 1.

12. A system, comprising:
at least one processor; and
a memory communicatively connected with the at least one processor, wherein
the memory stores processor instructions executable by the at least one processor, and the processor instructions, when executed by the at least one processor, cause an instruction execution unit, of the at least one processor, to:
send a completion request signal to an instruction retirement unit, wherein the completion request signal is used to request completion of instructions to be completed; and
after receiving a completion permission signal sent from the instruction retirement unit, send instruction completion information of the instructions to be completed to the instruction retirement unit, wherein the instruction retirement unit stores the instruction completion information into instruction buffer table entries in a buffer, performs, based on the instruction completion information stored in each of the instruction buffer table entries, retirement processing on instructions to be retired that have already been completed and have not been retired, and deletes the instruction completion information of retired instructions from the instruction buffer table entries, wherein a number of the instruction buffer table entries in the buffer is greater than 1 and less than an out-of-order degree allowed by the at least one processor, each of the instruction buffer table entries is used to store the instruction completion information of one instruction.

13. The system according to claim 12, wherein the processor instructions, when executed by the at least one processor, further cause the instruction execution unit to:
receive an instruction submission signal from the instruction retirement unit and submit a currently submittable instruction corresponding to the currently submission signal and preceding instructions for the currently submittable instruction, wherein the preceding instructions for the currently submittable instructions have already been retired or completed and will not cause a speculation failure.

14. The system according to claim 13, wherein the instruction submission signal comprises an instruction identifier of the currently submittable instruction, wherein the instruction identifier of an instruction is obtained in response to dispatching the instruction, and the instruction identifier is used to indicate a timing relationship of instructions; and the processor instructions, when executed by the at least one processor, further cause the instruction execution unit to: acquire the instruction identifier of an instruction to be submitted that initiates a submission request, and, in a case where the instruction identifier of the instruction to be submitted is older than or equal to the instruction identifier of the currently submittable instruction, submit the instruction to be submitted.

15. A computing device, comprising: the system according to claim 12.

16. The computing device according to claim 15, wherein the processor instructions, when executed by the at least one processor, cause the at least one processor to convert instructions from an ordered state to a disordered state and assign instruction identifiers to the instructions, wherein the instruction identifiers are used to indicate a new-old relationship of the instructions; and transmit the instructions of the disordered state to the instruction execution unit.

17. An instruction processing method applied to an instruction retirement unit, the instruction processing method comprising receiving a completion request signal, which is sent by an instruction execution unit for instructions to be completed, wherein the completion request signal is used to request completion of the instructions to be completed;

after determining, based on a new-old relationship between retired instructions and the instructions to be completed, that the instructions to be completed can be completed, sending, to the instruction execution unit, a completion permission signal for the instructions to be completed, receiving instruction completion information of the instructions to be completed sent from the instruction execution unit, and storing the instruction completion information of the instructions to be completed into instruction buffer table entries in a buffer, wherein a number of the instruction buffer table entries in the buffer is greater than 1 and less than an out-of-order degree allowed by a processing unit, and each of the instruction buffer table entries is used to store the instruction completion information of one instruction; and performing, based on the instruction completion information stored in each of the instruction buffer table entries, retirement processing on instructions that have already been completed and have not been retired, and deleting the instruction completion information of the retired instructions from the instruction buffer table entries.

18. An instruction processing method applied to an instruction execution unit, the instruction processing method comprising sending a completion request signal to an instruction retirement unit, wherein the completion request signal is used to request completion of instructions to be completed; and after receiving a completion permission signal sent from the instruction retirement unit, sending instruction completion information of the instructions to be completed to the instruction retirement unit, wherein the instruction retirement unit stores the instruction completion information into instruction buffer table entries in a buffer, performs, based on the instruction completion information stored in each of the instruction buffer table entries, retirement processing on instructions to be retired that have been completed and have not been retired, and deletes the instruction completion information of retired instructions from the instruction buffer table entries, wherein a number of the instruction buffer table entries in the buffer is greater than 1 and less than an out-of-order degree allowed by a processing unit, and each of the instruction buffer table entries is used to store the instruction completion information of one instruction.

\* \* \* \* \*